(12) United States Patent
Hitchcock

(10) Patent No.: US 7,383,576 B2
(45) Date of Patent: Jun. 3, 2008

(54) METHOD AND SYSTEM FOR DISPLAYING AND MANAGING SECURITY INFORMATION

(75) Inventor: Daniel Wade Hitchcock, Bothell, WA (US)

(73) Assignee: Microsoft Corporation, Redmond, WA (US)

( * ) Notice: Subject to any disclaimer, the term of this patent is extended or adjusted under 35 U.S.C. 154(b) by 839 days.

(21) Appl. No.: 10/830,741

(22) Filed: Apr. 23, 2004

(65) Prior Publication Data

US 2005/0240996 A1    Oct. 27, 2005

(51) Int. Cl.
*H04L 9/32*    (2006.01)
(52) U.S. Cl. ....................................... 726/17
(58) Field of Classification Search ................... 726/17
See application file for complete search history.

(56) References Cited

U.S. PATENT DOCUMENTS 6,408,336 B1 *    6/2002    Schneider et al. .......... 709/229

OTHER PUBLICATIONS

Microsoft TechNet, How to Migrate your NT 4.0 Directory Service to Windows Server 2003 Active Directory, Nov. 24, 2003 http://www.microsoft.com/technet/community/events/windows2003srv/tnt1-99.mspx.*

Microsoft Corporation, "Active Directory Overview," 2004, 12 pages http://www.microsoft.com/windows2000/server/evaluation/features/dirlist.asp.

Bragg, R., "Trust in Windows Server 2003," Sep. 2003, 101communications LLC, 7 pages http://mcpmag.com/columns/print.asp?EditorialsID=593.

Policht, M., "Exploring Windows 2003 Security: Overview," Jul. 17, 2003, Jupitermedia Corporation, 4 pages http://www.serverwatch.com/tutorials/article.php/2236651.

Kaminsky, M., et al., "Decentralized User Authentication in a Global File System," 19th ACM Symposium on Operating Systems Principles, New York, Oct. 19-22, 2003, 14 pages.

Eloff, J. et al., "Information Security Management—A New Paradigm," Proceedings of SAICSIT, 2003, pp. 130-136.

* cited by examiner

*Primary Examiner*—Kambiz Zand
*Assistant Examiner*—Cordelia Kane
(74) *Attorney, Agent, or Firm*—Perkins Coie LLP

(57) ABSTRACT

A method and system for managing security information for a domain of computer systems is provided. The security system displays security information for a selected security object, such as a user or a computer system. The security system initially retrieves security information that includes security specifications that each has the identification of an entity, a resource, and an access right for the selected security object. The security system then displays an identification of the entity and the resource along with the access right for each security specification. When the security information is stored in a security store (i.e., the main security store) by resource and, for each resource, the entities that have access rights to that resource, the security system may use an auxiliary security store to facilitate the retrieval of the security information.

31 Claims, 10 Drawing Sheets

| | resource | entity | |
|---|---|---|---|
| main domain | computer 1 | John Doe | A |
| | computer 1 | Adam Smith | A |
| domain 1 | computer 2 | Tom Frank | D |
| domain 2 | ⋮ | | |
| domain 3 | computer 5 | John Doe | A |
| | computer 5 | Jane Smith | D |
| | ⋮ | | |
| | computer 8 | John Doe | A |
| | ⋮ | | |
| | computer 12 | John Doe | A |
| | ⋮ | | |
| | computer 14 | John Doe | D |
| | ⋮ | | |

*FIG. 2B*

METHOD AND SYSTEM FOR DISPLAYING AND MANAGING SECURITY INFORMATION

TECHNICAL FIELD

The described technology relates generally to managing security information for a domain of computer systems.

BACKGROUND

Current network systems allow trusted relationships to be established between domains of computer systems. A domain of computer systems is a collection of computer systems that share the common attribute of being in the same domain. For example, all the computer systems of a company may form the domain of the company, and the computer systems of the human resource department of the company may form the human resource domain of the company. Oftentimes, users of computer systems in one domain may allow users of another domain to access their resources (e.g., data files and application files). For example, the president of the company whose computer system is in an executive domain may have access to the personnel files (i.e., a type of resource) that are stored on the computer systems of the human resource domain. To allow access to the personnel files, an administrator of the human resource domain may establish a "trust relationship" with the users of the executive domain. Once the trust relationship is established, the president of the company, being a member of the trusted domain, may be able to access the desired personnel files. The administrator of the human resource domain is said to establish an "incoming trust" for the human resource domain with the executive domain, which means that the users of the executive domain are trusted by the administrator of the human resource domain. The administrator of the executive domain could also establish a trust relationship between the executive domain and the human resource domain. This trust relationship would allow the users of the human resource domain to access the resources of the executive domain. In this case, an "outgoing trust" for the human resource domain with the executive domain is established that allows users of the human resource domain to access resources of the executive domain. The "incoming trust" for the human resource domain would be an "outgoing trust" for the executive domain, and the "incoming trust" for the executive domain would be an "outgoing trust" for the human resource domain.

Once a trust relationship is established between domains, access to the resources of the domain with the incoming trust can be controlled by an access control list ("ACL") or some other control mechanism. For example, a manager within the human resource domain may specify that the president has read-only access to his personnel file and read-write access to the personnel files of the other executives of the company. When the president requests access to his personnel file, the security mechanism of the human resource domain checks the ACL of that personnel file to ensure that the requested access is consistent with the access rights of the president. If not, the president is denied access.

It can be very time-consuming for administrators and users of a domain that has an incoming trust relationship to establish the appropriate access rights to all its resources for all the users of the trusted domain. To help facilitate establishing access rights, at least one network security mechanism provides an "allowed-to-authenticate" access right between computer systems of the domain with the incoming trust and users of the domain with the corresponding outgoing trust. For example, the administrator of the human resource domain may specify that the executives of the company are allowed to authenticate to the personnel server of the human resource domain that contains the personnel files. When the president requests access to the personnel files, the president's computer system first attempts to authenticate to the personnel server. If the human resource administrator has allowed the president the right to authenticate to the personnel server, the network security mechanism authenticates the president to ensure that it is really the president who has requested the access. Once the authentication is complete, the president can then access the resources (e.g., personnel files) of the personnel server in accordance with the ACL of those resources. If none of the resources of the personnel server has an ACL that grants the president access rights, then although the president can be authenticated, the president will not be able to access any of the resources.

The authentication process used by a network security mechanism may be a standard Kerebos authentication technique in which a Kerebos client of the president's computer system provides a user name and password to a Kerebos server of the human resource domain. The Kerebos server validates the user name and password, ensures that the user has the allowed-to-authenticate access rights to the requested computer system, and if so, provides a "ticket" to the user. That ticket is used whenever that user attempts to access a resource of the computer system to which it has been authenticated. If the ticket is valid, then access to the resource is allowed in accordance with the ACL of the resource. If not, access is denied.

Some network security mechanisms store security information, such as allowed-to-authenticate information, for a domain in a central repository using a directory server such as an LDAP directory or "MICROSOFT ACTIVE DIRECTORY." Each computer system of a domain may have an entry within a central repository that specifies which users of domains with outgoing trusts to this domain are allowed to authenticate to that computer system. For example, the entry for the personnel server of the human resource domain may specify that a group of users, referred to as "executives," of the executive domain are allowed to authenticate to the personnel server. The entry may alternatively list the user names of each executive. A network security mechanism accesses this central repository whenever a user of a domain with an outgoing trust to this domain requests to authenticate to a computer system of this domain.

Such central repositories of security information store the information for each computer system, but they do not store the information in a way that all the access rights of individual users of domains with outgoing trusts can be quickly determined. To determine the access rights of a user, the entire store of security information would need to be accessed to identify to which computer systems the user has access rights (e.g., allowed-to-authenticate access rights). Because domains can have hundreds of thousands of computer systems and can have incoming trust relationships with many different domains, each with hundreds of thousands of users, the security information of the central repository can be extremely large, and it can take a long time to identify all the access rights of an individual user. For example, in one case, it took a computer program more than three days to compile a list that indicated, for each user with an allowed-to-authenticate access right, the list of computer systems to which the user had the allowed-to-authenticate access right. As a result, some administrators do not use certain security features of network security mechanisms because it is impractical to identify and control the access rights of individual users.

It would be desirable to have an effective way that would allow an administrator to view and control security information for individual users.

SUMMARY

A security system for maintaining security information is provided. In one embodiment, the security system provides a main security store for a domain that contains entries for resources of the domain that identify entities and their access rights to the resources. The security system also provides an auxiliary security store with entries that identify the access rights of an entity to a resource. The security system uses the auxiliary security store when providing a user interface through which an administrator can view and update access rights. The security system uses the main security store when verifying access rights of an entity to a resource. When a user specifies to update access rights, the security system updates both the main security store and the auxiliary security store. In this way, the security system allows an administrator to effectively control security information on a per-entity basis and keeps the main security store synchronized with the auxiliary security store.

BRIEF DESCRIPTION OF THE DRAWINGS

FIG. 2B is a display page that illustrates the display of allowed-to-authenticate security specifications of a resource in one embodiment.

DETAILED DESCRIPTION

Figure 1:
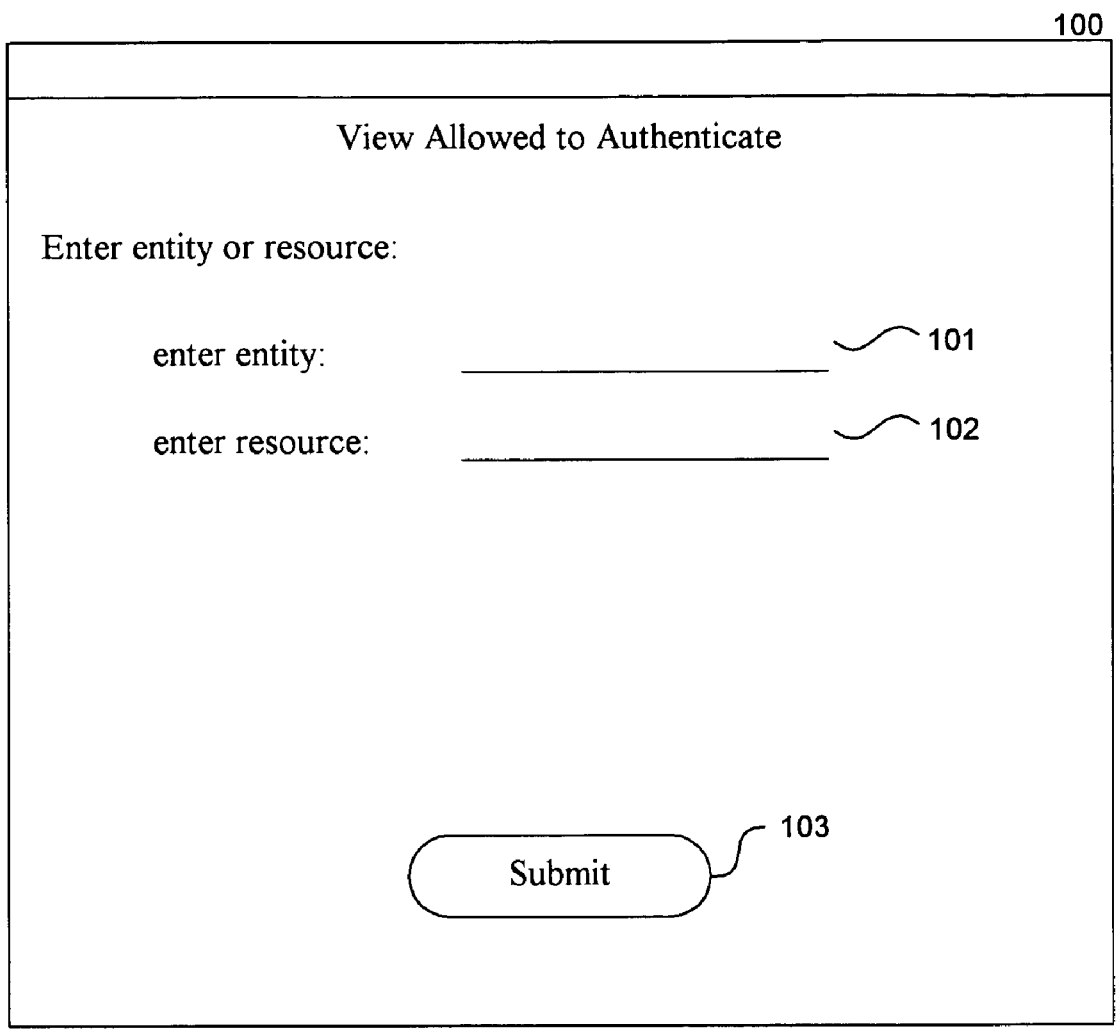
FIG. 1 is a display page that illustrates entry of a selected object whose security specifications are to be displayed in one embodiment.

A method and system for managing security information for a domain of computer systems is provided. In one embodiment, the security system displays security information for a selected security object, such as a user or a computer system. The security system initially retrieves security information that includes security specifications that each has the identification of an entity, a resource, and an access right for the selected security object. An entity may include a user or groups of users, a resource may include computer systems, and an access right may specify whether the entity is allowed to authenticate to the resource. The security system then displays an identification of the entity and the resource along with the access right for each security specification. When the security information is stored in a security store (i.e., the main security store) by resource and, for each resource, the entities that have access rights to that resource, the security system may use an auxiliary security store to facilitate the retrieval of the security information. In one embodiment, the auxiliary security store contains an entry for each security specification specified in the main security store.

A security specification defines a triplet of an entity, a resource, and an access right, meaning that the entity has the specified access right to the resource. The entity may also be referred to as a "source" of the access right, and the resource may also be referred to as the "destination" of the access right. This source and destination terminology is similar to terminology used by firewall mechanisms that specify what sources have what access rights to what destinations. The security system may use the auxiliary security store when providing an administrator with access to the security information. In particular, when an administrator wants to view security information, the security system retrieves the security specifications from the auxiliary security store, rather than the main security store. In addition, when an administrator wants to modify security information, the security system uses the security specifications of the auxiliary security store to assist the administrator in specifying what security information is to be modified. The security system also updates both the main security store and the auxiliary security store to reflect the modification. In this way, an administrator can use the security system, which uses the auxiliary security store, to effectively manage the security information for their domain, and the network security mechanism can still use the main security store when checking whether an entity requesting access to a resource has access rights sufficient for the requested access.

In one embodiment, the security system may initially populate the auxiliary security store by compiling security specifications from the security information from the main security store. Although it may take a long time to retrieve and process the security information of the main security store, the retrieval and processing needs to be done only once. After the auxiliary security store is initially populated, the security system updates both the main security store and the auxiliary security store whenever the security information is updated. Because it is important for the main security store and the auxiliary security store to be consistent, the security system after updating both the main security store and the auxiliary security store may retrieve the updated security information from the security stores to ensure that the updates completed correctly. If not, the security system may notify an administrator so that corrective action can be taken. The security system may also log all updates to the security information so that updates for the security stores can be rolled forward or backward as appropriate. In one embodiment, the security system may ensure that only users (e.g., administrators) with the privilege to enable or disable the access rights (e.g., allowed-to-authenticate) managed by the security system are allowed to update the security information.

In one embodiment, the security system allows access rights to be inherited from parent security objects. For example, if a user has been granted the right to authenticate to a domain of computer systems, then each sub-container of the domain inherits that grant. Further, each computer system of each sub-container also inherits that grant. The security system, however, allows an administrator to override an inherited access right. For example, an administrator can specify that a user does not have the access right to a certain computer system of the sub-container to override the inherited grant. The security system, in one embodiment, does not allow nested overrides of access rights. For example, if an administrator overrides the inherited grant for a sub-container, the security system would not allow an administrator to override the override inherited by a computer system of the sub-container. Thus, the administrator could not specify that the sub-container is not granted the inherited access right, but a computer system of the sub-container is granted the inherited access right. If an administrator needs the computer system to be granted the access right, then the hierarchical structure of the security objects can be reorganized so that the computer system is not in the sub-container whose inherited rights have been overridden. Alternatively, the computer system may also be in another domain through which it inherits the access right.

Figure 2A:
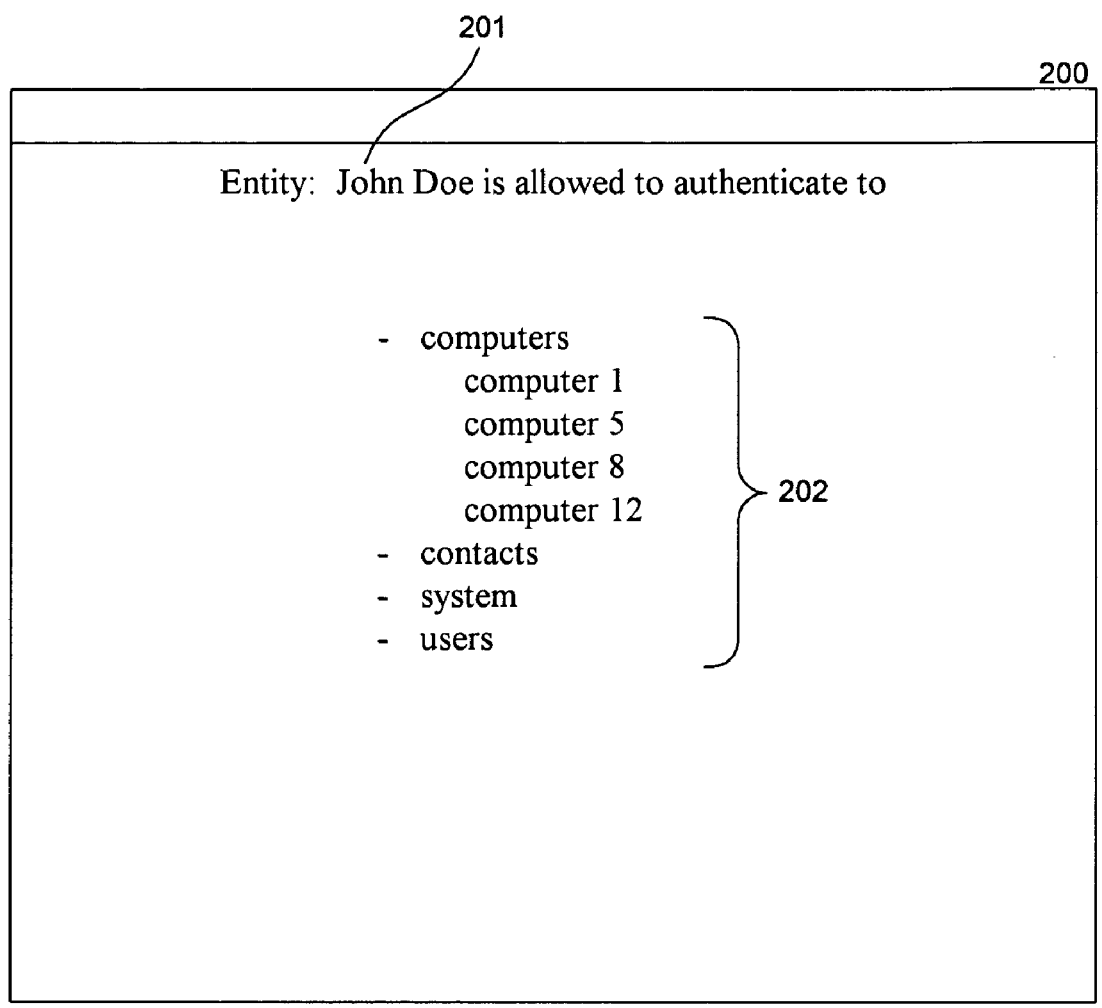
FIG. 2A is a display page that illustrates the display of allowed-to-authenticate security specifications for an entity in one embodiment.
Figure 3:
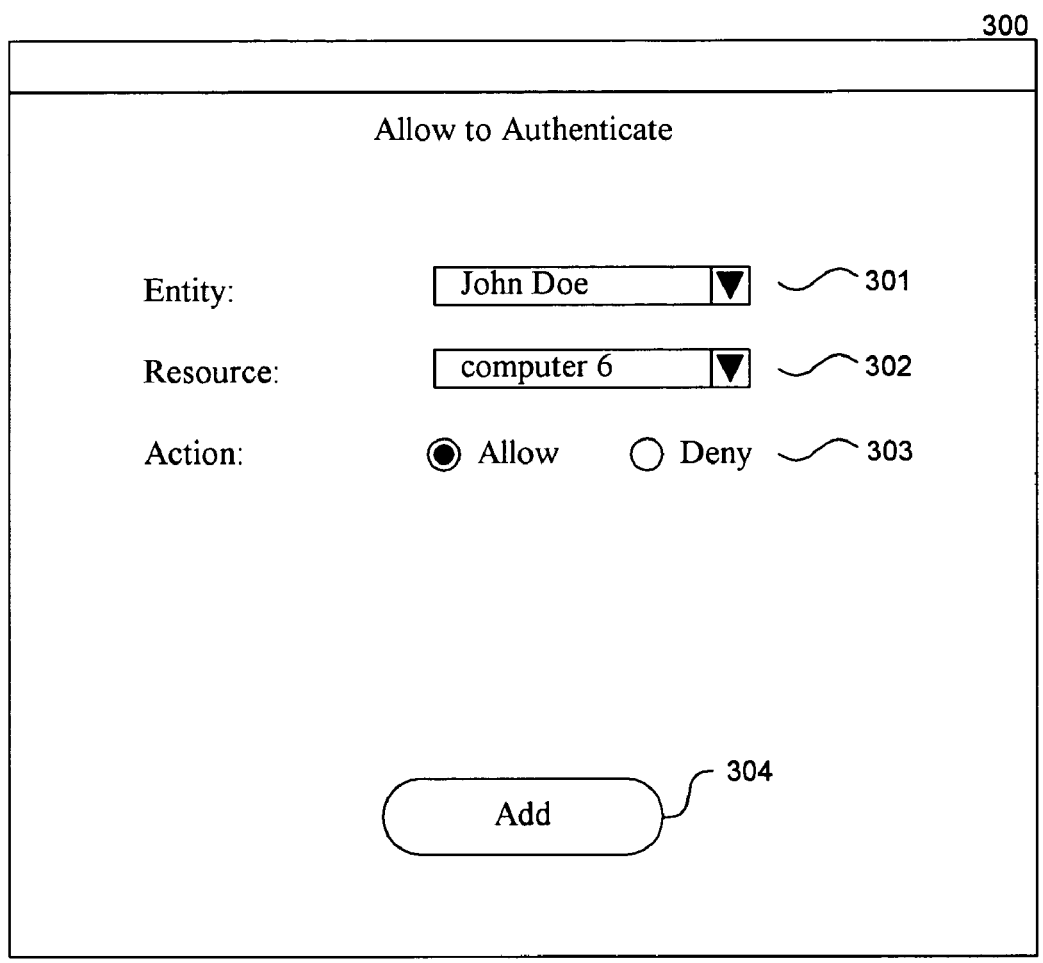
FIG. 3 is a display page that illustrates the creating of an allowed-to-authenticate security specification in one embodiment.

FIGS. 1-3 are display pages that illustrate the managing of allowed-to-authenticate security information in one embodiment. FIG. 1 is a display page that illustrates entry of a selected object whose security specifications are to be displayed in one embodiment. The display page 100 contains data entry fields 101 and 102 for entry of the identification of an entity or a resource. The data entry fields may provide drop-down lists or browsing capabilities to facilitate the selection of the security object. The submit button 103 is selected by an administrator when the allowed-to-authenticate security specifications are to be identified for the entity or resource. For example, to view the security information for the president of a company, the administrator would enter the president's name, John Doe, into the entity field and select the submit button. Alternatively, the administrator would enter the name of a resource in the resource field and select the submit button to view security information for that resource. After the submit button is selected, then security specifications for the identified security object are displayed as shown in FIG. 2A.

FIG. 2A is a display page that illustrates the display of allowed-to-authenticate security specifications for an entity in one embodiment. The display page 200 includes a security object identification field 201, and a security information area 202. The security object identification field identifies the security object via the display page of FIG. 1. In this case, the user with the name "John Doe" is the entity whose security specifications are to be displayed. The security information area contains a listing of the resources to which "John Doe" has the right to authenticate. In this example, "John Doe" has the right to authenticate to "computer1," "computer5," "computer8," and "computer12." One skilled in the art will appreciate that the security specifications can be selected in a way that reflects the underlying hierarchy of the security objects. For example, an entity may be a group of users that is defined by various sub-groups. The security system may allow an administrator to view the security specifications for the group and drill down to the sub-groups and ultimately an individual user. Similarly, a resource may be specified as a domain within sub-domains, and an administrator can select to view all security specifications for resources within the domain or sub-domain.

FIG. 2B is a display page that illustrates the display of allowed-to-authenticate security specifications of a resource in one embodiment. The display page 250 includes a domain identification area 251 and a security specification area 252. When an administrator selects a domain, the security system displays the security specifications for that domain in the security specification area. The security specification area includes a resource column 253, an entity column 254, and an access right column 255. Each row of the security specification area identifies a resource and entity and corresponding access right.

FIG. 3 is a display page that illustrates the creating of an allowed-to-authenticate security specification in one embodiment. The display page 300 includes a entity identification field 301, a resource identification field 302, action specification radio buttons 303, and an add button 304. The entity identification identifies the entity for which a security specification is to be created. The entity identification field may contain a drop-down list of entities. In this example, the security object is the entity John Doe. The resource identification field is used to specify the resource for which the entity is to have a security specification added. The resource identification field may contain a drop-down list of computer systems of the domain with the incoming trust. The action radio buttons specify whether the entity is allowed to authenticate to the resource. The administrator, after specifying the entity, resource, and action, selects the add button to add the security specification to the auxiliary security store and to update the main security store accordingly.

Figure 4:
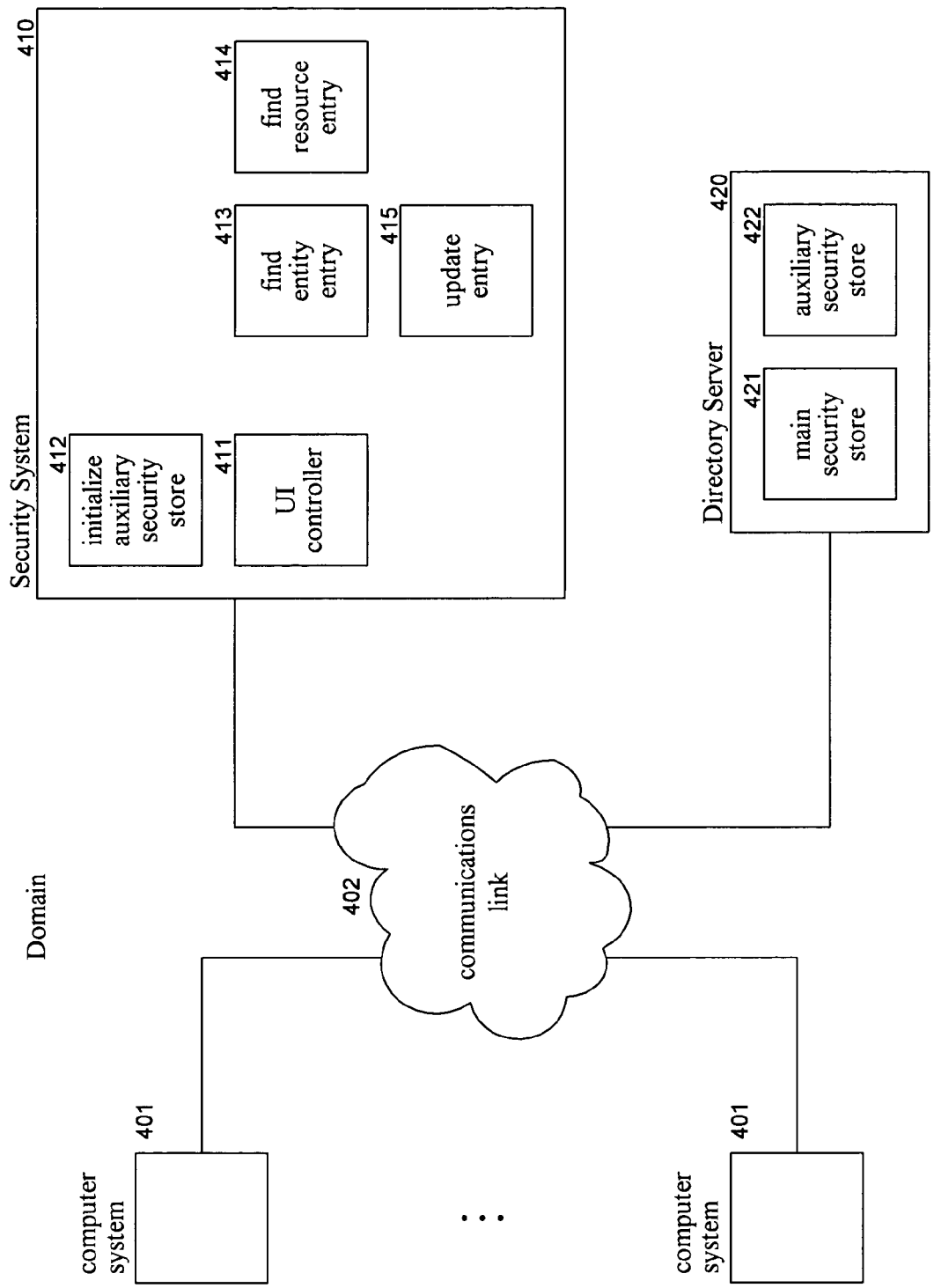
FIG. 4 is a block diagram illustrating components of a domain that implements the security system in one embodiment.

FIG. 4 is a block diagram illustrating components of a domain that implements the security system in one embodiment. The domain includes computer systems 401, a security system 410, and a directory server 420 interconnected via communications link 402. The directory server provides access to a main security store 421 and an auxiliary security store 422. One skilled in the art will appreciate that the auxiliary security store may be located on a server separate from the server on which the main security store is located. The security system includes a UI controller 411, an initialize auxiliary security store component 412, a find entity entry component 413, a find resource entry component 414, and an update entry component 415, which may each execute the computer system on which the security system is installed. The UI controller provides the user interface for the security system as illustrated, for example, by FIGS. 1-3. The UI controller invokes the find entity entry component and the find resource entry component to retrieve security information from the auxiliary security store. The UI controller invokes the update entry component to update security information in both the main security store and the auxiliary security store. The initialize auxiliary security store component populates the auxiliary security store initially based on security information of the main security store.

The computing device on which the security system is implemented may include a central processing unit, memory, input devices (e.g., keyboard and pointing devices), output devices (e.g., display devices), and storage devices (e.g., disk drives). The memory and storage devices are computer-readable media that may contain instructions that implement the security system. In addition, the data structures and message structures may be stored or transmitted via a data transmission medium, such as a signal on a communications link. Various communications links may be used, such as the Internet, a local area network, a wide area network, or a point-to-point dial-up connection.

FIG. 4 illustrates an example of a suitable operating environment in which the security system may be implemented. The operating environment is only one example of a suitable operating environment and is not intended to suggest any limitation as to the scope of use or functionality of the security system. Other well-known computing systems, environments, and configurations that may be suitable for use include personal computers, server computers, handheld or laptop devices, multiprocessor systems, microprocessor-based systems, programmable consumer electronics, network PCs, minicomputers, mainframe computers, distributed computing environments that include any of the above systems or devices, and the like.

The security system may be described in the general context of computer-executable instructions, such as program modules, executed by one or more computers or other devices. Generally, program modules include routines, programs, objects, components, data structures, and so on that perform particular tasks or implement particular abstract data types. Typically, the functionality of the program modules may be combined or distributed as desired in various embodiments.

Figure 5:
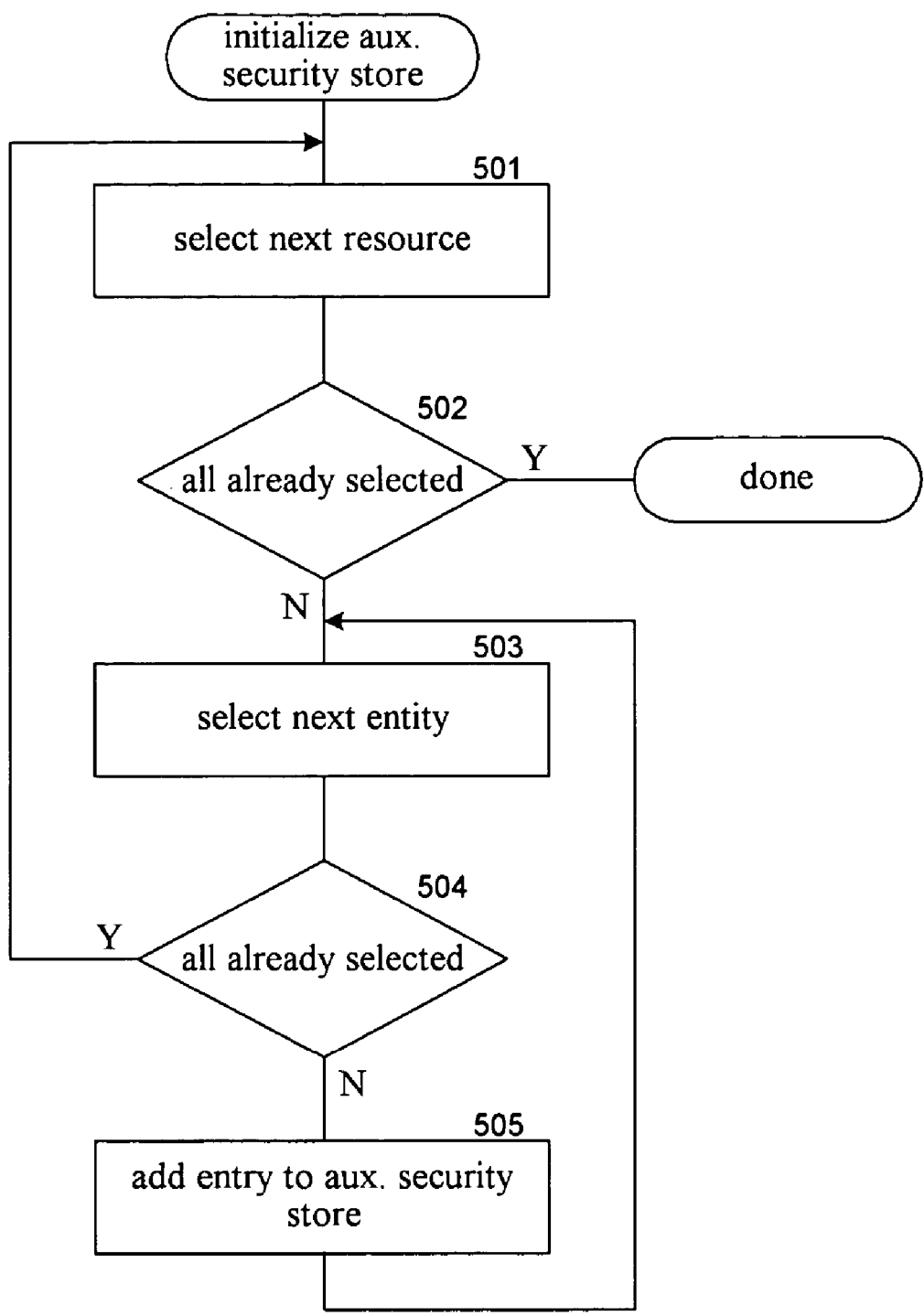
FIG. 5 is a flow diagram that illustrates the processing of the initialize auxiliary security store component in one embodiment.

FIG. 5 is a flow diagram that illustrates the processing of the initialize auxiliary security store component in one embodiment. This component retrieves allowed-to-authenticate information from the main security store and populates the auxiliary security store with security specifications derived from the retrieved security information. In blocks 501-505, the component loops selecting each resource of the main security store and each entity that has allowed-to-authenticate information specified for that resource. In block 501, the component selects the next resource of the main security store. In decision block 502, if all the resources of the main security store have already been selected, then the component completes, else the component continues at block 503. In block 503, the component selects the next entity for the selected resource from the main security store. In decision block 504, if all the entities have already been selected, then the component loops to block 501 to select the next resource, else the component continues at block 505. In block 505, the component adds a security specification to the auxiliary security store that specifies the selected resource and selected entity along with the allowed-to-authenticate action (i.e., deny or allow). The component then loops to block 503 to select the next entity for the selected resource.

Figure 6:
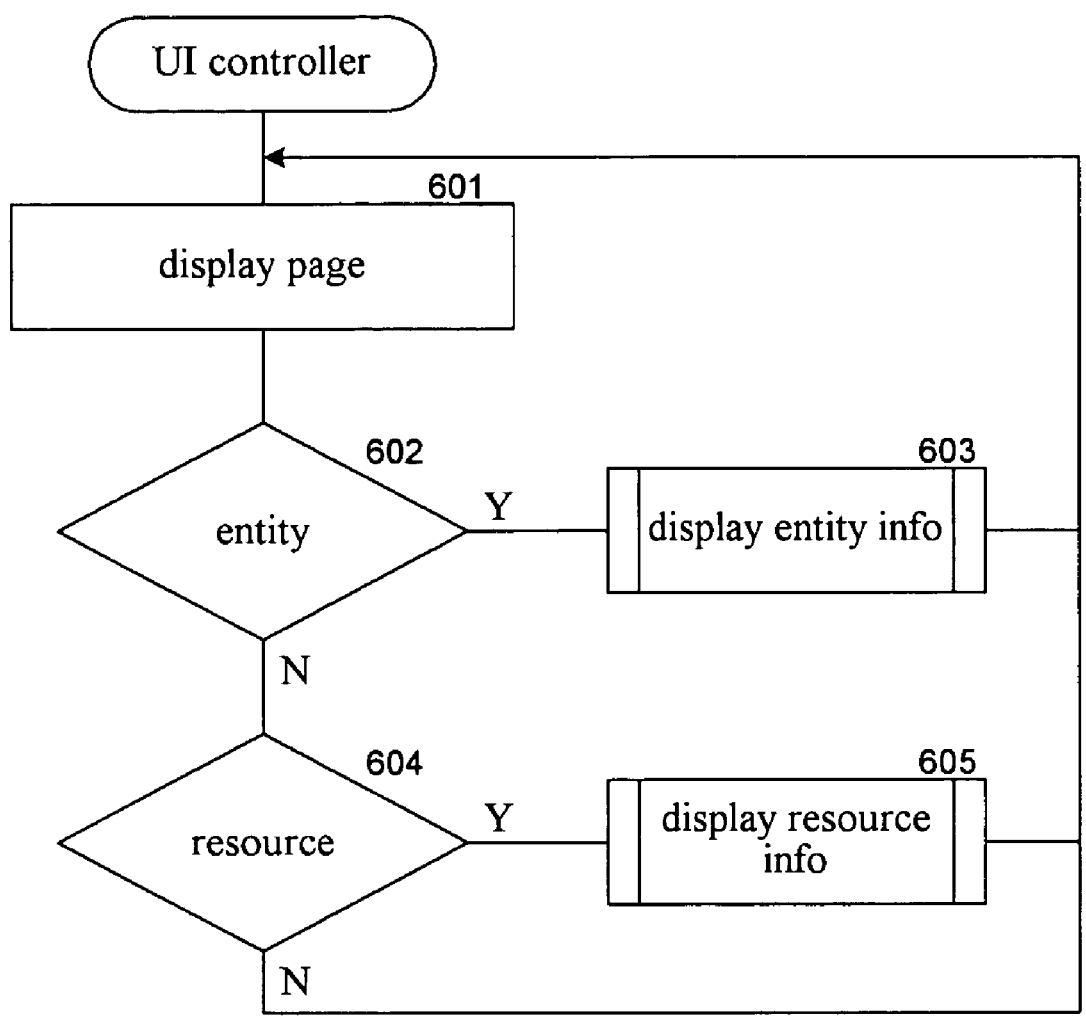
FIG. 6 is a flow diagram that illustrates the processing of the Ul controller in one embodiment.

FIG. 6 is a flow diagram that illustrates the processing of the UI controller in one embodiment. In block 601, the UI controller displays a display page such as that of FIG. 1. In decision block 602, if the administrator has entered the identification of an entity, then the component continues at block 603, else the component continues at block 604. In block 603, the UI controller invokes a display entity information component to control the display of the security specifications for the identified entity. The component then loops to block 601 to re-display the display page. In decision block 604, if the administrator has entered the identification of a resource, then the UI controller continues at block 605, else the UI controller loops to re-display the display page. In block 605, the UI controller invokes the display resource information component to display the security specifications for the identified resource and then loops to block 601 to re-display the display page.

Figure 7:
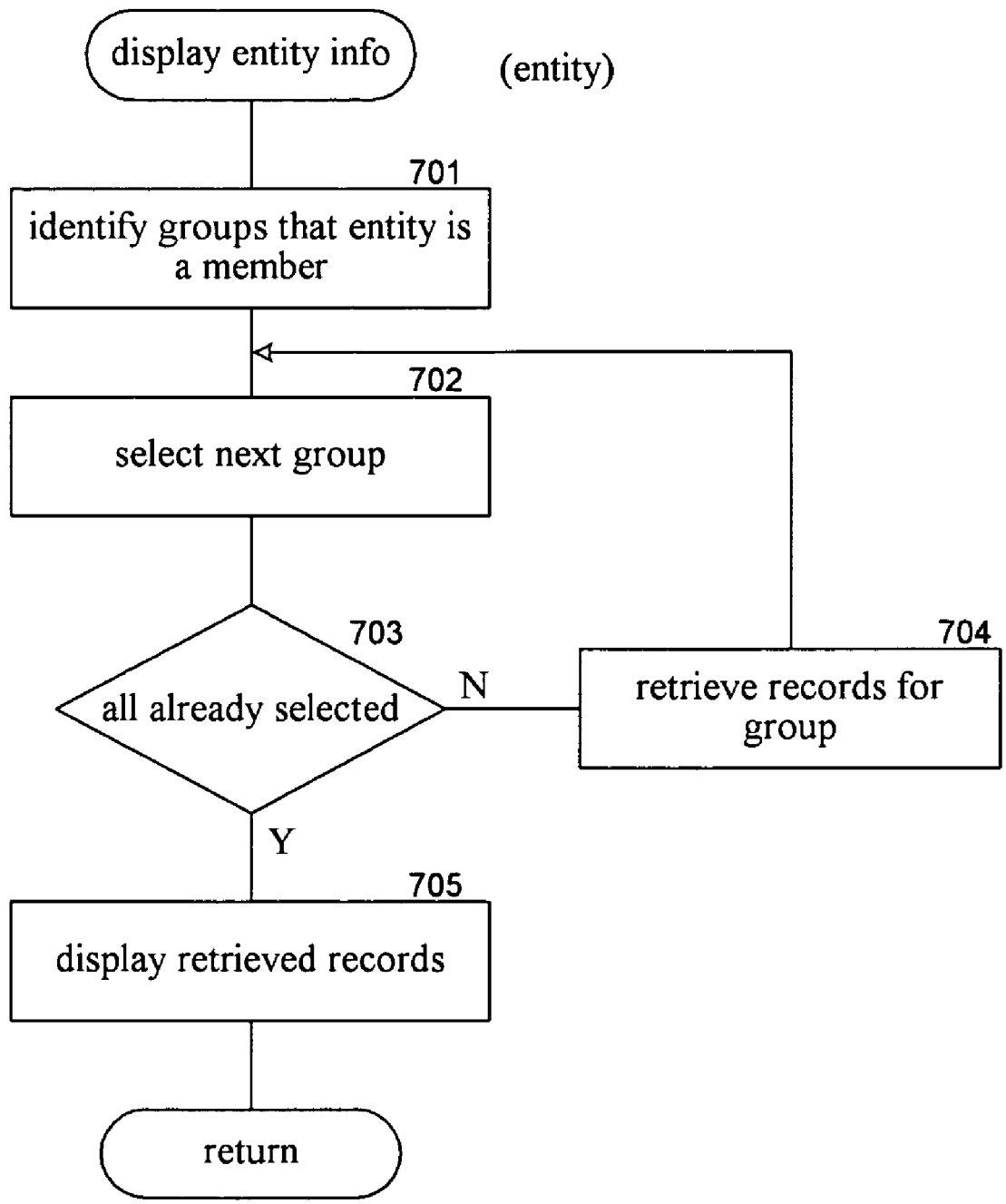
FIG. 7 is a flow diagram that illustrates the processing of the display entity information component in one embodiment.

FIG. 7 is a flow diagram that illustrates the processing of the display entity information component in one embodiment. This component is passed the identification of an entity and controls the displaying of security specifications for the identified entity. In block 701, the component identifies the groups to which the entity belongs. The component may identify the groups by contacting the domain of that entity and requesting it to identify the groups to which the entity belongs. The domain may traverse a "member of" tree to identify all the groups to which the entity transitively belongs. In blocks 702-704, the component loops retrieving the entries from the auxiliary security store for the groups. The entity itself can be considered a group by itself. In block 702, the component selects the next group. In decision block 703, if all the groups have already been selected, then the component continues at block 705, else the component continues at block 704. In block 704, the component retrieves security specifications for the selected group from the auxiliary security store and then loops to block 702 to select the next group. In block 705, the component displays the retrieved security specifications, for example, as shown in FIG. 2A.

Figure 8:
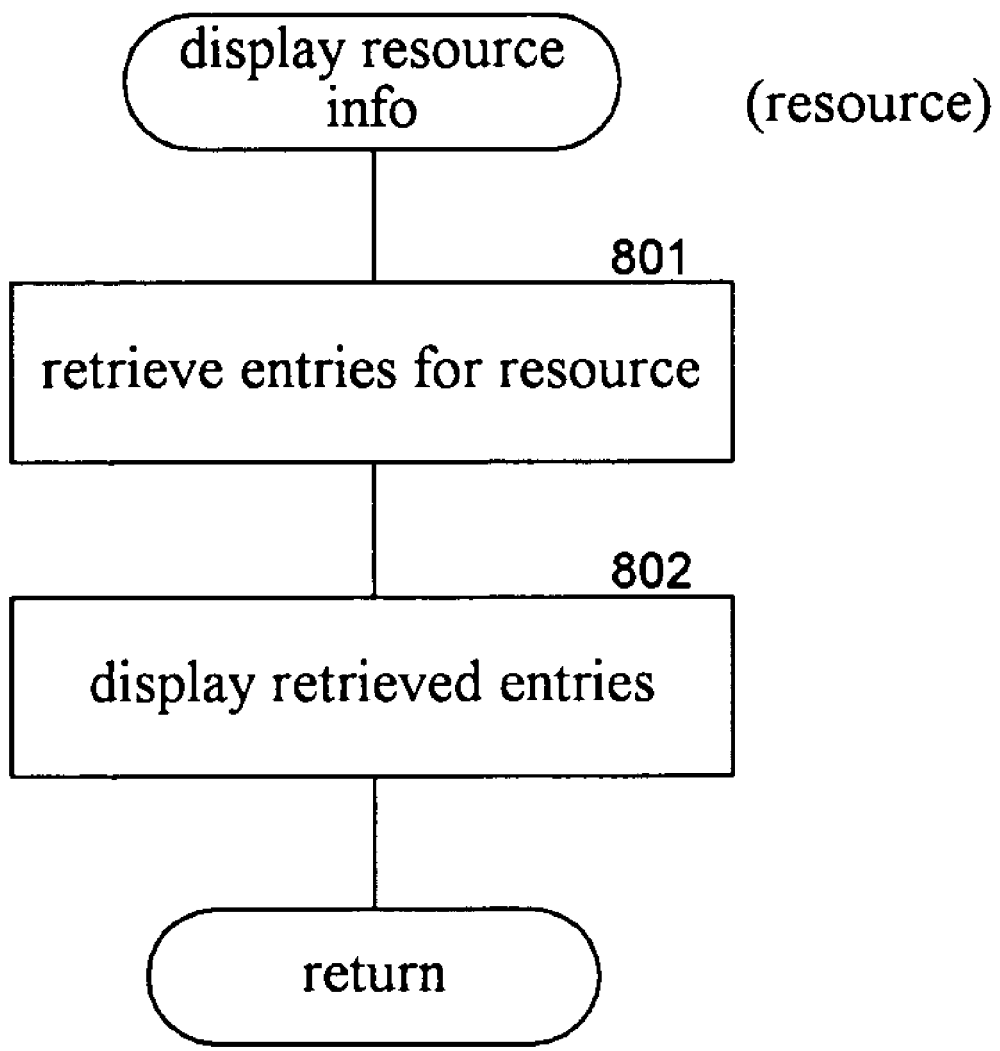
FIG. 8 is a flow diagram that illustrates the processing of the display security specification component in one embodiment.

FIG. 8 is a flow diagram that illustrates the processing of the display security specification component in one embodiment. The component is passed the identification of a domain and displays the security specifications relating to the identified domain. In block 801, the component retrieves the security specifications from the auxiliary security store for the identified domain. In block 802, the component displays the retrieved security specifications, for example, as in FIG. 2B. The component then completes.

Figure 9:
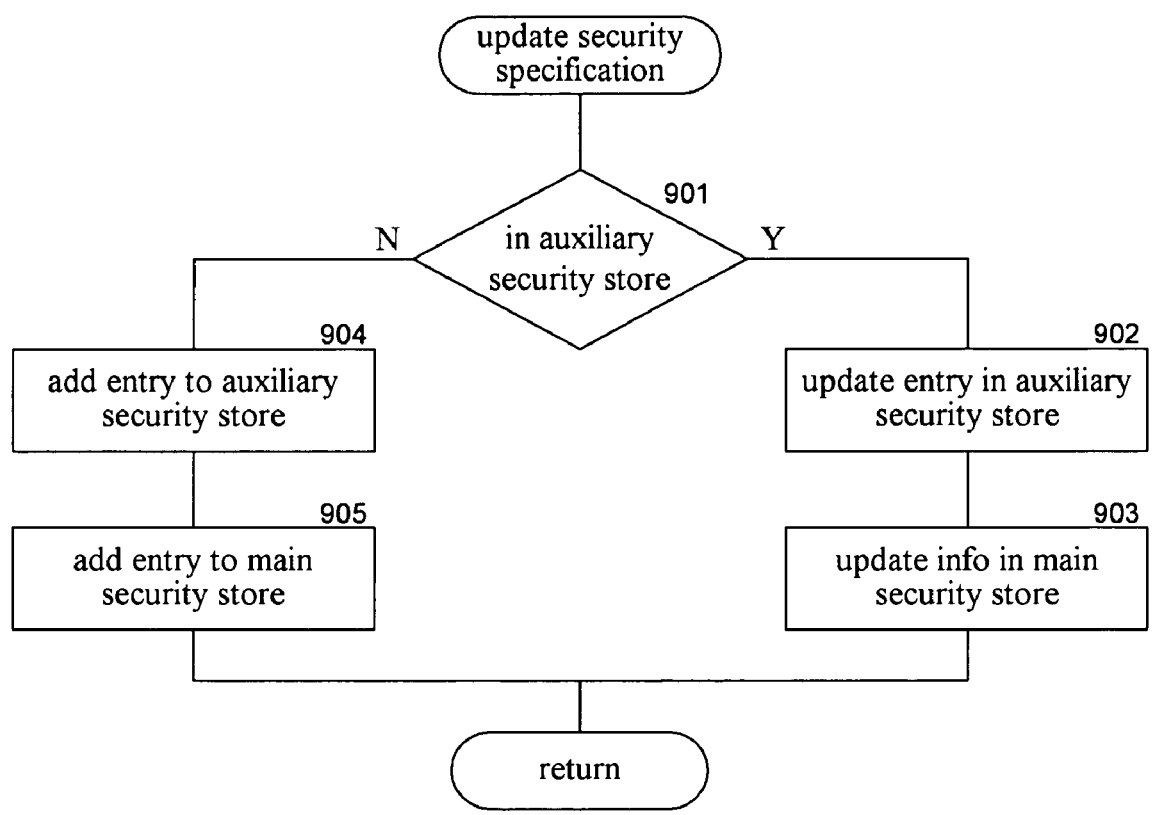
FIG. 9 is a flow diagram that illustrates the processing of the update security specification component in one embodiment.

FIG. 9 is a flow diagram that illustrates the processing of the update security specification component in one embodiment. The component is passed a security specification that identifies an entity, a resource, and an access right. This component is invoked after an administrator has specified a security specification (e.g., using the display page of FIG. 3). In decision block 901, if a security specification for the entity and resource pair is already in the auxiliary data store, then the component continues at block 902, else the component continues at block 904. Although not illustrated in the figure, a flag indicating whether to delete the security specification may also be passed. In block 902, the component updates the security specification of the auxiliary security store to reflect the new access right of the passed security specification. In block 903, the component updates the security information of the main security store and then returns. In block 904, the component adds the passed security specification to the auxiliary security store. In block 905, the component updates the security information in the main security store as indicated by the passed security specification and then returns.

One skilled in the art will appreciate that although specific embodiments of the security system have been described herein for purposes of illustration, various modifications may be made without deviating from the spirit and scope of the invention. One skilled in the art will appreciate that a domain may be defined in terms of users or computer systems, or both. One skilled in the art will appreciate that the security system may be adapted to manage firewall or IP security filter rules that may be stored in a main security store. Accordingly, the invention is not limited except by the appended claims.

I claim:

1. A method in a computer system for displaying allowed-to-authenticate information, the method comprising:
   a. receiving a selection of a security object that is an entity;
   b. retrieving allowed-to-authenticate information for the selected security object, the information identifying the entity, a resource, and an action wherein when the entity attempts to authenticate to the resource the action indicates whether to allow or deny the attempt to authenticate to the resource; and c. displaying an indication of the selected security object along with the retrieved allowed-to-authenticate information;

d. wherein the allowed-to-authenticate information is retrieved from an auxiliary security store that is used when providing a user interface for viewing the allowed-to-authenticate information and that is separate from a main security store used by a security mechanism when an entity attempts to authenticate to a resource, the auxiliary security store and the master security store having different data organizations that are adapted for accessing the allowed-to authenticate information, the auxiliary security store adapted for accessing allowed-to authenticate information for an entity and the master security store adapted for accessing allowed-to authenticate information for a resource.

2. The method of claim 1 including modifying the action associated with an entity and resource.

3. The method of claim 1 including creating new allowed-to-authenticate information that specifies whether an entity is allowed to authenticate to a resource.

4. The method of claim 1 including when the selected security object is a user, identifying all groups of which the user is a member and retrieving allowed-to-authenticate information for the identified groups.

5. The method of claim 1 wherein the entities are represented as sources and the resources are represented as destinations.

6. The method of claim 1 wherein the resources are in one domain and the entities are in another domain and the one domain has an incoming trust relationship with the other domain.

7. A method in a computer system for maintaining security information, the method comprising:

e. providing a main security store for a domain, the main security store containing entries for resources of the domain, each entry for a resource identifying entities and an access right of each entity to the resource;

f. providing an auxiliary security store for the domain, the auxiliary security store containing entries for entities, each entry for an entity identifying a resource and access right of the entity to the resource;

g. receiving from a user a selection of a security object;

h. retrieving from the auxiliary security store entries relating to the selected security object; and i. displaying the entities, resources, and access rights of the retrieved entries j. wherein the provided main security store is used when verifying access rights of an entity to a resource and k. wherein the auxiliary security store and the main security store have different data organizations that are adapted for accessing the security information, the auxiliary security store adapted for accessing security information for an entity and the main security store adapted for accessing security information for a resource.

8. The method of claim 7 including receiving an indication to change access rights of an entity to a resource and updating entries of both the main security store and the auxiliary security store.

9. The method of claim 7 including initially generating the auxiliary security store from the entries of the main security store.

10. The method of claim 7 wherein the access right is whether an entity is allowed to authenticate to a resource.

11. The method of claim 7 wherein the main security store is implemented using a directory service of the domain.

12. The method of claim 11 wherein the auxiliary security store is implemented using the directory service of the domain.

13. The method of claim 7 including, when the selected security object is an entity, identifying groups of which the entity is a member and retrieving from the auxiliary security store entries relating to the identified groups.

14. The method of claim 7 wherein the entities are represented as sources and the resources are represented as destinations.

15. The method of claim 7 wherein the resources are in one domain and the entities are in another domain and the one domain has an incoming trust relationship with the other domain.

16. A computer system for displaying security information, comprising:

l. a component that receives a selection of a security object that is a source;

m. a component that retrieves security information for the selected security object, the security information identifying the source, a destination, and an access right wherein when the source attempts to access to the destination, the access right is used to control access to the destination; and n. a component that displays an indication of the source, destination, and access right of the retrieved security information;

o. wherein the security information is retrieved from an auxiliary security store that is used when providing a user interface for viewing the security information and that is separate from a main security store used by a security mechanism when a source attempts to authenticate to a destination, the auxiliary security store and the master security store having different data organizations that are adapted for accessing the security information, the auxiliary security store being adapted for accessing security information for a source and the main security store being adapted for accessing security information for a destination.

17. The computer system of claim 16 wherein the security information is allowed-to-authenticate information.

18. The computer system of claim 16 including a component that modifies the access right associated with a source and a destination.

19. The computer system of claim 16 including a component that creates new security information that specifies an access right of a source to a destination.

20. The computer system of claim 16 including, when the selected security object is a user, identifying all groups of which the user is a member and retrieving security information for the identified groups.

21. The computer system of claim 16 wherein the sources are entities and the destinations are resources.

22. The computer system of claim 16 wherein the destinations are in one domain and the sources are in another domain and the one domain has an incoming trust relationship with the other domain.

23. A computer system for maintaining security information, comprising:

p. a main security store for a domain, the main security store containing entries for resources of the domain, each entry for a resource identifying entities and an access right of each entity to the resource;

q. an auxiliary security store for the domain, the auxiliary security store containing entries for entities of the domain, each entry for an entity having security specifications that each identify an access right of the entity to a resource;

r. a component that displays entities, resources, and access rights retrieved from the auxiliary security store; and s. a component that uses the main security store to verify access rights when an entity attempts to access a resource t. wherein the auxiliary security store and the main security store have different data organizations that are adapted for accessing the security information, the auxiliary security store adapted for accessing security information for an entity and the main security store adapted for accessing security information for a resource.

24. The computer system of claim 23 including a component that receives an indication to change access rights of an entity to a resource and a component that updates both the main security store and the auxiliary security store.

25. The computer system of claim 23 including a component that generates the auxiliary security store from the main security store.

26. The computer system of claim 23 wherein an access right is whether an entity is allowed to authenticate to a resource.

27. The computer system of claim 23 wherein the main security store is implemented using a directory service of the domain.

28. The computer system of claim 27 wherein the auxiliary security store is implemented using the directory service of the domain.

29. The computer system of claim 23 including a component that identifies a group of which the entity is a member and retrieves from the auxiliary security store entries relating to the identified groups.

30. The computer system of claim 23 wherein the entities are represented as sources and the resources are represented as destinations.

31. The computer system of claim 23 wherein the resources are in one domain and the entities are in another domain and the one domain has an incoming trust relationship with the other domain.

* * * * *